United States Patent [19]

Bastide et al.

[11] Patent Number: 5,391,347
[45] Date of Patent: Feb. 21, 1995

[54] PROCESS FOR THE PRODUCTION OF SINTERED NUCLEAR FUEL PELLETS FROM PRECIPITATED SOLUTIONS WITH THE AID OF HYDROGEN PEROXIDE IN AN ACID MEDIUM

[76] Inventors: Bernard Bastide, RN 75 Le Village, 38500 La Buisse; Antoine Floreancig, 4 Les Mas de la Murette, 38140 La Murette, both of France

[21] Appl. No.: 180,478

[22] Filed: Jan. 12, 1994

Related U.S. Application Data

[63] Continuation of Ser. No. 808,874, Dec. 19, 1991, abandoned.

[30] Foreign Application Priority Data

Dec. 19, 1990 [FR] France ............... 90 16381

[51] Int. Cl.$^6$ ............ B22F 1/00; C01G 56/00
[52] U.S. Cl. ............ 419/38; 419/48; 423/11; 423/16
[58] Field of Search ........ 423/7, 11, 16; 75/711, 75/739, 749, 751, 758, 950, 951; 264/0.05; 422/159; 419/38

[56] References Cited

U.S. PATENT DOCUMENTS

| | | | |
|---|---|---|---|
| 4,152,395 | 5/1979 | Börner et al. | 423/16 |
| 4,271,127 | 6/1981 | Börner et al. | 422/159 |
| 4,615,834 | 10/1986 | Yamagishi et al. | 252/635 |
| 4,839,339 | 6/1989 | Bunker et al. | 505/1 |
| 4,971,734 | 11/1990 | Floreancig et al. | 264/0.5 |
| 5,001,107 | 3/1991 | Bunker et al. | 505/1 |

FOREIGN PATENT DOCUMENTS 0054014  11/1981 .
2100712  6/1982  United Kingdom .

OTHER PUBLICATIONS

Reactor Fuel Processing, fol. 5, No. 3, Jul. 1962, pp. 61–71, "Production of uranium, thorium, plutonium and their compounds".

*Primary Examiner*—Donald P. Walsh
*Assistant Examiner*—John N. Greaves
*Attorney, Agent, or Firm*—Pollock, Vande Sande & Priddy

[57] ABSTRACT

Process for obtaining fritted oxide pellets of the $M_xO_y$ type for nuclear fuels from solutions of soluble salts of the element or elements M, involving stage of precipitating the elements M by hydrogen peroxide in an acid medium. During this precipitation, there is an instantaneous dispersion of one of the reagents (solution of salts or peroxide) in the other, in order to obtain a homogenous mixture and an also instantaneous precipitation of the nuclei in a continuous liquid phase confined in an enclosure having minimum dimensions, the mother liquors being rapidly exhausted. The process makes it possible to obtain sintered pellets whose density exceeds 96% of the theoretical density.

13 Claims, 1 Drawing Sheet

PROCESS FOR THE PRODUCTION OF SINTERED NUCLEAR FUEL PELLETS FROM PRECIPITATED SOLUTIONS WITH THE AID OF HYDROGEN PEROXIDE IN AN ACID MEDIUM

This is a continuation of application Ser. No. 07/808,874, filed Dec. 19, 1991, now abandoned.

FIELD OF THE INVENTION

The invention relates to a process for obtaining nuclear fuel pellets of very good quality of sintered oxides (in particular having a very high density), of the MxOy type, from solutions containing the element M, which is precipitated with the aid of hydrogen peroxide in an acid medium.

In the present, text M represents all elements or mixtures of elements conventionally used in the production of nuclear fuel pellets, and in particular all fissile or fertile elements, such as U, Pu, Th, etc. or neutrophage elements such as Hf, etc.

STATE OF THE ART

Fuel pellets of sintered oxides MxOy are generally obtained from aqueous solutions of soluble salts, e.g., nitrates, sulphates, etc. of one or more elements M, and by carrying out a process in stages. During this process it is necessary to convert the element or elements into solid form in order to finally obtain the sought sintered oxides, e.g., oxides based on $UO_2$ or a mixture of $UO_2$ and $PuO_2$.

The conversion into solid form can be obtained by precipitating the elements M from the aqueous solution. This precipitation can be carried out by a base (e.g. soda, ammonia, etc.), but this leads to a prejudicial liquid effluent in the form of an alkali metal salt, whose disposal causes problems.

It is therefore known and preferable to carry out precipitation with the aid of hydrogen peroxide in order to obtain as the byproduct a recyclable acid, the elements M being precipitated in the form of peroxides.

However, in this case, the morphology of the particles obtained is such that, during the succeeding stages of the process (drying, calcination, reduction), the intermediate oxide powders obtained are often inadequately fluid, special grinding and/or conditioning treatments (screening, granulation, adjuvants) then being necessary and which lead to pellets of inadequate sintered density. It has therefore been proposed to carry out the precipitation in a partly neutralized medium, the pH then being maintained between 1 and 3.5 by the addition of a base end in reactors having a special design (cf. e.g., U.S. Pat. Nos. 4,152,395 and 4,271,127 and French Patent No. 2 634 048). The sintered pellets so obtained are satisfactory, but the acid cannot be recycled end is then again found in part as a alkali metal salt effluent whose disposal is problematio.

SUMMARY OF THE INVENTION

To overcome these problems, the present invention is designed to precipitate the elements M in peroxide form in an acid medium (not partly neutralized), so as to obtain intermediate filtrable powders, so that, following compression and sintering and without any special conditioning treatment, sintered oxide pellets are obtained which have improved characteristics and in particular adequate density for optimum usage in a nuclear reactor. Thus, the sintered density generally exceeds 96% of the theoretical density, and this is more particularly the case with pellets based on $UO_2$.

The invention also relates to a process in which all the byproduct acid during precipitation is recycled.

DETAILED DESCRIPTION

Figure 1:
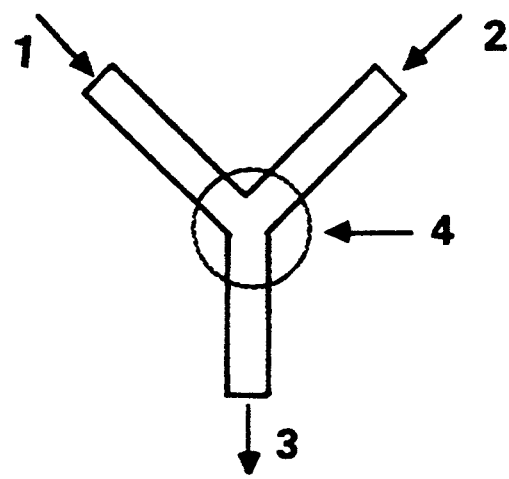
FIGS. 1 and 2 illustrate special embodiments of the precipitation process according to the invention, in which: 1 represents the supply tube for one of the reagents, e.g., the hydrogen peroxide solution; 2 represents the supply tube for the other reagent, e.g., the aqueous solution of a soluble salt of M; 3 represents the discharge tube for the peroxide suspension of M in the mother liquors constituted by a solution of the byproduct acid and the hydrogen peroxide excess; and 4 represents the reduced volume where the reagents arrive and where one reagent is instantaneously dispersed in the other, together with the precipitation reaction.

The invention relates to a process for obtaining pellets of sintered oxides MxOy, M representing one or more metals or elements used in the constitution of the nuclear fuel pellets, the process comprising the successive steps of:

a) treating an initial solution of soluble salts of the element or elements M with the aid of a hydrogen peroxide solution, the solution and the peroxide being called reagents, b) obtaining a precipitate of peroxides in suspension in mother liquors, c) separating the precipitate from the mother liquors, d) drying, calcinating and optionally reduction of said precipitate leading to intermediate oxide powders, and e) sintering the powder.

The process makes it possible to directly obtain pellets of sintered oxides having a very high density, generally exceeding 96% of the theoretical density and of improved quality, while avoiding particular conditioning treatments of the intermediate oxide powders. In the precipitation treatment (a), there is an instantaneous dispersion of one reagent in the other in a continuous liquid phase confined in an enclosure having the minimum possible dimensions, in order to obtain a homogeneous mixture and a precipitation of also instantaneous nuclei, while avoiding any enlargement of the nuclei through the rapid exhaustion of the mother liquors.

It is important to limit the contact time between the precipitate obtained and the reagent or reagents which have not yet reacted. Thus, by a continuous, simultaneous supply of all the reagents, the suspension obtained is rapidly discharged from the reaction zone so that the particles which are formed do not come into contact with the new supply of reagents and in particular the saline solution of soluble salts.

In order that the mixture of reagents may be homogeneous on the microscopic scale, the precipitation reaction generally takes place in the continuous liquid phase in the smallest possible, confined volume.

The soluble salts may be nitrates, sulphates, chlorides, carbonates, etc. and the solutions contain one or more elements M. Preference is given to the use of nitrates and sulphates, and more especially nitrates.

The process is particularly applicable to solutions based on uranium having a random origin and $U_{235}$ content, either alone or mixed with other elements, e.g., Pu, Th, HF, etc. These solutions are generally acid.

It is preferable to operate with at least one of the reagents in concentrated solution. Thus, the concentration of the element H in the starting solution, particularly U, is generally in excess of 150 g/l or preferably 300 g/l, the $H_2O_2$ content of the hydrogen peroxide solution then possibly being only 30% by weight. However, it is also possible to use a hydrogen peroxide solution titrating up to 70% or more $H_2O_2$.

It is very important for the hydrogen peroxide quantity to be in moderate excess compared with the stoichiometry of the precipitation reactions, which are expressed by the following equation (in the case of uranyl nitrate precipitation at below 65° C.):

$$UO_2(NO_3)_2 + 4H_2O + H_2O_2 \rightarrow UO_4, 4H_2O + 2HNO_3$$

at a temperature exceeding 65° C., $UO_4, 2H_2O$ is obtained.

This excess is generally below five times the stoichiometry and preferably below twice the stoichiometry and contributes to the rapid exhaustion of the starting solution.

Generally, the saline starting solution is acid and the pH obtained in the resulting suspension is between 0 and 0.5.

After obtaining the precipitate of peroxides suspended in mother liquors, the latter is filtered, if need be in the presence of a flocculating agent, e.g., in anionic form. It is then dried and calcined to transform the peroxide into oxide. The latter is then reduced, e.g., in the presence of hydrogen at high temperature, so that if necessary the desired degree of oxidation for its use as a fuel pellet is obtained. In the case of uranium, the calcination leads to the stage $UO_3$ or $U_3O_8$, as a function of the final temperature of the calcination, the oxides then being reduced at approximately 600° to 700° C., under a nitrogen and hydrogen atmosphere, in order to obtain $UO_2$.

The optionally reduced oxide is then shaped by compression and fritted in accordance with known procedures.

The invention hence makes it possible to obtain during the process solid intermediate precipitates which filter well or even very well, even if the use of conventional flocculating agents is sometimes advantageous. Once these precipitates have been dried or calcined, they give easily pourable and handlable powders without any special conditioning treatment (such as grinding, screening, granulation, etc.). The latter lead to crude pellets of oxides of good stability, improved over prior art pellets obtained in an acid medium. The resulting fritted pellets are also of improved quality, their density generally exceeding 96% of the theoretical density.

The precipitate of peroxides obtained according to the invention has a very limited grain size dispersion and is in the form of agglomerates having a unitary size, generally between 10 and 15 μm. They are formed from fine elementary particles of compact shape, more or less spheroidal shape, e.g., having a length/diameter ratio not exceeding approximately 1 to 2.

By comparison, prior art precipitations carried out by hydrogen peroxide in an acid medium (not partly neutralized) lead to powders constituted by complex entangled parts which are difficult to destroy and elongated needles generally having a length/diameter ratio exceeding 10. These powders are difficult to sinter with good results and, in the case of uranium, normally sintered pellet densities exceeding 93% of the theoretical density are not obtained. Even when using a very high compacting pressure, the density obtained is inadequate for satisfactory use as a nuclear fuel.

The process according to the invention is more economical, because it makes it possible to use concentrated starting solutions, and the acid produced during precipitation can be integrally recycled, following possible concentration, without any discharge of disturbing effluent.

All types of reactors bringing about instantaneous homogeneous mixing of the reagents in the smallest possible space and without discontinuity of the liquid phases, and making it possible to limit the contact times of the products formed with the new reagents, are suitable and in particular this applies to jet reactors.

Thus, according to the invention, the soluble salt solution is rapidly exhausted, the precipitate formed is immediately discharged from the reaction zone with the aid of the rapidly exhausted mother liquors, and in the reduced volume there are no preexisting nuclei when the new reagents reach the same.

EXAMPLE 1

This example illustrates the difficulty of obtaining fuel pellets having satisfactory properties using a precipitation by hydrogen peroxide in an acid medium according to the prior art. For this purpose, the uranium from a uranyl nitrate solution containing 350 gU/l was precipitated with the aid of 30% by weight hydrogen peroxide, the two reagents being simultaneously introduced into a conventional, stirred 3 liter reactor.

The precipitate obtained was filtered, washed, calcined at 650° C. and then reduced at 600° C. in the presence of hydrogen. The $UO_2$ powder obtained had a BET specific surface of 1.27 m²/g and a O/U ratio of 2.02.

Compacting in pellet form was carried out at different pressures, the highest pressures being at the equipment use limits. The crude pellets obtained were then sintered at 1750° C. under an $N_2 + H_2$ atmosphere.

The fritted density of the pellets was then measured as a percentage of the theoretical density (dth) and their thermal stability was evaluated by the density difference obtained after a refritting cycle at 1700° C., whereby said difference must not exceed 1%. The results are as follows:

|  | Pressure | | | |
| --- | --- | --- | --- | --- |
| (MPa) | 290 | 360 | 450 | 660 |
| (bar) | 2900 | 3600 | 4500 | 6600 |
| Crude density | 5.6 | 5.8 | 6.0 | 6.4 |
| Sintered density (% dth) | 92.6 | 93.4 | 94.2 | 95.0 |
| Thermal stability (dth difference in %) | 1.27 | 1.15 | 1.15 | 1.01 |

It can be seen that for normal compacting pressures and normal crude densities, the sintered densities obtained are very inadequate. It is necessary to use abnormally high pressures to increase the sintered densities, which sometimes do not reach an adequate value. The thermal stability is also inadequate.

EXAMPLE 2

This example illustrates the invention.

Figure 2:
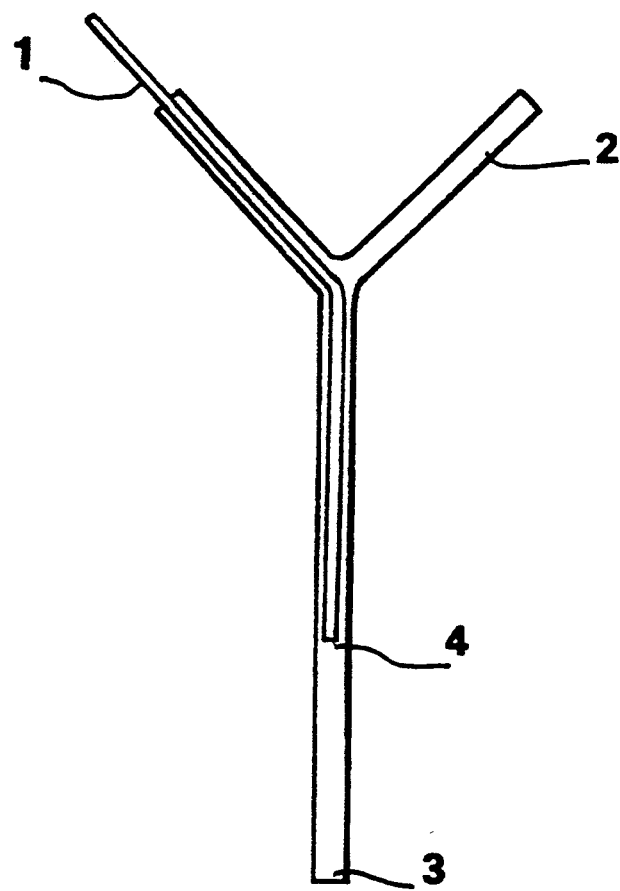

Use was made of a uranyl nitrate solution containing 370 gU/l and 0.5N free acidity. The uranium was precipitated with the aid of a hydrogen peroxide solution containing 21% by weight of $H_2O_2$ in a reactor, in accordance with FIG. 2.

The hydrogen peroxide supply tube (1) had a diameter of 1 mm, the uranyl nitrate solution supply tube (2) a diameter of 4 mm level with the reaction zone (4) and the length of the tube between zone (4) and end (3) was 150 mm.

The nitrate solution was supplied at a rate of 400 $cm^3/h$ and that of the hydrogen peroxide at a rate of 200 $cm^3/h$. Working took place at 35° C. and in a container was collected a suspension of $UO_4, 4H_2O$ at a rate of approximately 200 g/h.

The suspension was filtered after slight dilution and the addition of 0.1% of a AN 945 BPM flocculating agent supplied by FLOERGER. The precipitate was dried at 500° C. and calcined for 4 hours at 650° C. to obtain an oxide, which was reduced at 700° C. under hydrogen.

This gave a powder with a specific surface of 2.1 $m^2/g$ with O/U ratio of 2.02.

Crude pellets were obtained by compression under 390 MPa in order to obtain a crude density of 5.9. After sintering at 1750° C. under $N_2+H_2$ atmosphere, the fritted density obtained was 96.6% of the theoretical density, which is an excellent result, taking account e.g., of the not very constraining conditions for obtaining the crude pellets.

In addition, the thermal stability was 0.56%, which is a normal value for $UO_2$ oxides conventionally employed in the production of nuclear fuels.

We claim:

1. Process for obtaining pellets of sintered oxides $M_xO_y$, M representing one or more metals or elements used in the constitution of nuclear fuel pellets, said process comprising the successive steps of:
    (a) precipitation treatment of an initial solution of soluble salts of the element or elements M in an acid medium by means of a hydrogen peroxide solution;
    (b) obtaining a precipitate of peroxides in suspension in a mother liquor;
    (c) separating said precipitate from said mother liquor;
    (d) drying, calcining and optionally reducing said precipitate leading to intermediate oxide powders; and,
    (e) compressing and sintering said powder,
    wherein said precipitation treatment is carried out in an acid medium in the absence of a neutralizing agent in a reactor where there is an instantaneous dispersion of one reagent in the other in a continuous liquid phase confined in an enclosure having minimal dimensions, in order to obtain, also instantaneously, a homogeneous mixture and a precipitation of nuclei, while avoiding enlargement of said nuclei through rapid exhaustion of said mother liquors, said process making it possible to directly obtain pellets of sintered oxides having a density generally exceeding 96% of a theoretical density and improved quality, while avoiding particular conditioning treatments of said intermediate oxide powders.

2. Process according to claim 1, wherein M represents at least one of the metals or elements used in nuclear fuels and selected from the group of fissile or fertile elements consisting of U, Pu, Th and neutrophage element Hr.

3. Process according to claim 2, wherein M represents uranium or mixtures based on uranium.

4. Process according to any one of claims 1 to 3, wherein said soluble salts are nitrates or sulphates.

5. Process according to any one of claims 1 to 3, wherein at least one of said reagents is in a concentrated solution.

6. Process according to any one of claims 1 to 3, wherein a concentration of said initial solution of soluble salts in elements exceeds 150 g/l.

7. Process according to any one of claims 1 to 3, wherein the hydrogen peroxide solution is added in an excess of less than five times the stoichiometry of the precipitation reactions.

8. Process according to any one of claims 1 to 3, wherein a contact time between the precipitate of peroxides formed and said reagents which have not reacted is limited.

9. Process according to any one of the claims 1 to 3, wherein said precipitation is carried out in a jet reactor.

10. Precipitate of peroxides obtained according to the process of any one of claims 1 to 3, constituted by agglomerates of elementary particles having a generally spheroidal shape and a maximum length-to-diameter ratio of approximately 2.

11. Precipitate according to claim 10, wherein said agglomerates have a size between 10 and 15 μm.

12. A process for obtaining pellets of sintered oxides having the formula $M_xO_y$, M representing one or more metals or elements used as a constituent of nuclear fuel pellets, said process comprising:
    (a) preparing a first reagent comprising an acidic aqueous solution of a salt of M;
    (b) preparing a second reagent comprising an aqueous solution of $H_2O_2$;
    (c) instantaneously dispersing said first and second reagents in one another in a reaction zone in the absence of a neutralizing agent, said reaction zone having minimal dimensions to form instantaneously a homogeneous mixture of a precipitate of a peroxide of M in a mother liquor;
    (d) instantaneously removing the resulting precipitate and mother liquor from the reaction zone to avoid contact of the precipitate with a supply of unreacted reagent;
    (e) separating said precipitate from said mother liquor;
    (f) drying, calcining and optionally reducing said precipitate to provide an intermediate oxide powder; and
    (g) compressing and sintering the resulting calcined powder,
    said process directly providing pellets having a density of at least 96% theoretical density.

13. A process according to claim 12, wherein said suspension has a pH of 0–0.5.

* * * * *